July 23, 1968     G. J. DUSHECK, JR     3,394,309

TRANSIENT SIGNAL ANALYZER CIRCUIT

Filed April 26, 1965     2 Sheets-Sheet 1

INVENTOR.
GEORGE J. DUSHECK, JR.
BY
John T. O'Halloran
Attorney

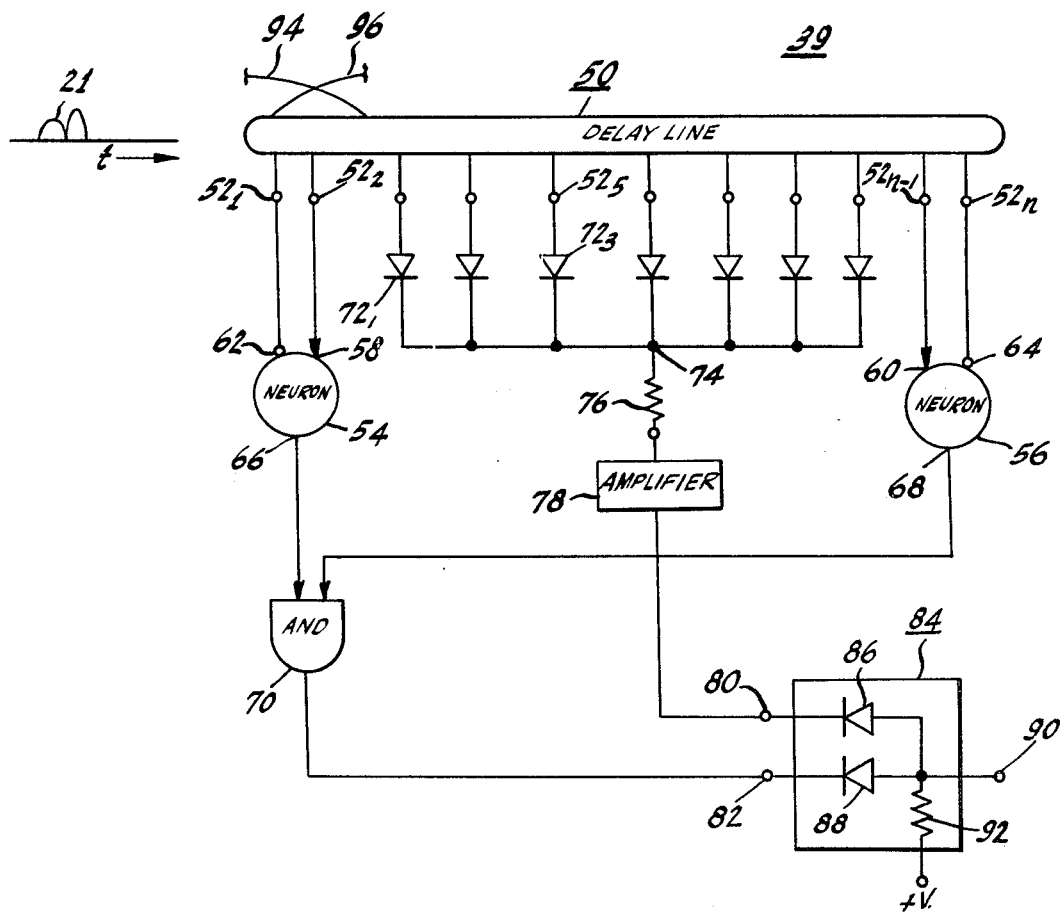

United States Patent Office 3,394,309
Patented July 23, 1968

3,394,309
TRANSIENT SIGNAL ANALYZER CIRCUIT
George J. Dusheck, Jr., Cinnaminson, N.J., assignor to Radio Corporation of America, a corporation of Delaware
Filed Apr. 26, 1965, Ser. No. 450,969
3 Claims. (Cl. 324—77)

ABSTRACT OF THE DISCLOSURE

A transient signal analyzer circuit extracts a desired signal from noise by applying a transient signal to a plurality of filters to obtain a plurality of component signals of different frequencies with each component signal containing a peak therein. Each component signal is delayed by a different amount to align the peaks and the values of the peaks are then detected for comparison with the stored characteristics of the desired signal.

---

This invention relates to signal recognition circuits, and more particularly relates to circuits for recognizing random transient signals.

In various types of signal recognition systems, it is frequently desirable to be able to extract meaningful transient signals from noise transients even though both types of transients may be similar.

Accordingly, it is an object of this invention to provide a recognition circuit that extracts random transient signals from background noise.

It is another object of this invention to provide a transient signal peak detector that detects and measures the peak amplitudes of predetermined but randomly occurring transient signals.

A signal recognition circuit in accordance with the invention performs a frequency analysis on each input signal to extract transient signals from noise. The recognition circuit filters each input signal to provide a plurality of competent signals of preselected frequencies. Each component signal extracted from the desired transient signal builds up at a relatively fixed rate that differs from the other component signals. The differing rates cause each component signal to exhibit an initial and secondary peaks that occur at different times for different component signals. The component signals are delayed for different predetermined times to make the initial or secondary peak amplitudes line up or coincide in time. The simultaneous occurrence of the peak amplitudes are searched for and measured to provide a recognition signal when the peak amplitudes match those of a desired transient signal.

The simultaneous detection of the component signal peaks and their measurement is accomplished by storing temporarily each component signal in a delay line or other storage medium and connecting a slope detector to each end of each delay line to indicate when a positive and a negative slope are simultaneously detected at the sending and receiving ends, respectively, of the delayed lines. Each delay line has an electrical length corresponding to the shape of its component signal. Each peak detection signal generated by the slope detectors and each peak amplitude signal derived from the delay lines are applied to an output gate that produces an output equal to the lesser of the two inputs. Therefore, in the absence of a peak occurring in the delay period, the detection signal is zero and the output of the gate is zero. Upon the occurrence of a peak in the delay period, the peak detector generates a signal larger than the peak amplitude of the component signal so that the output gate produces an output signal corresponding to the detected peak amplitude signal.

Figure 1:
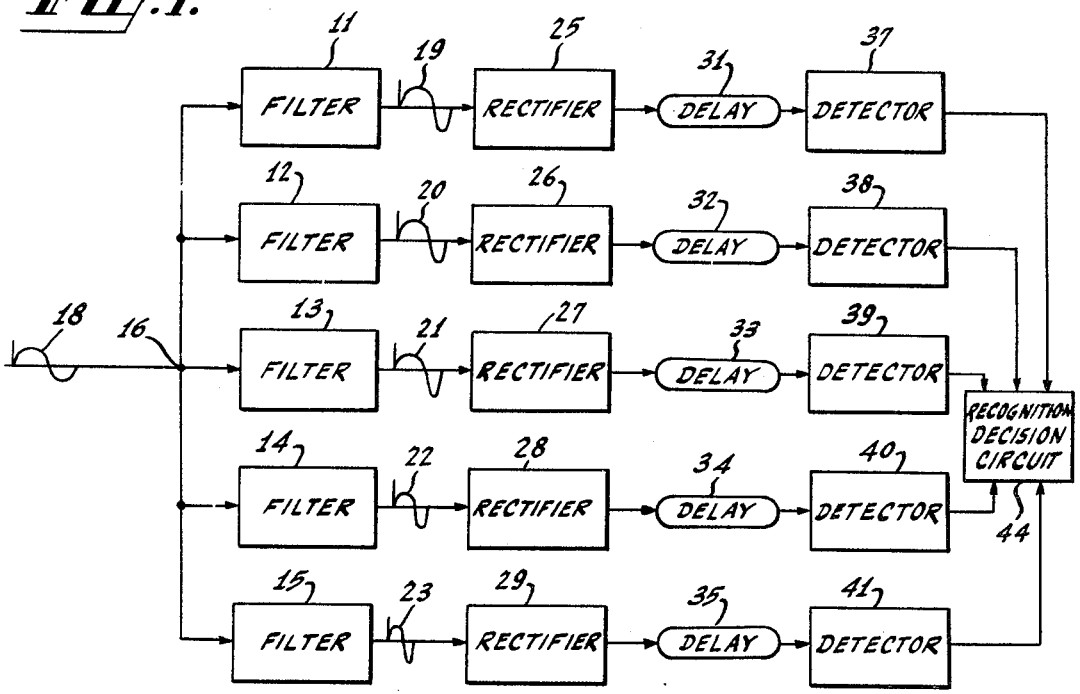
Figure 2:
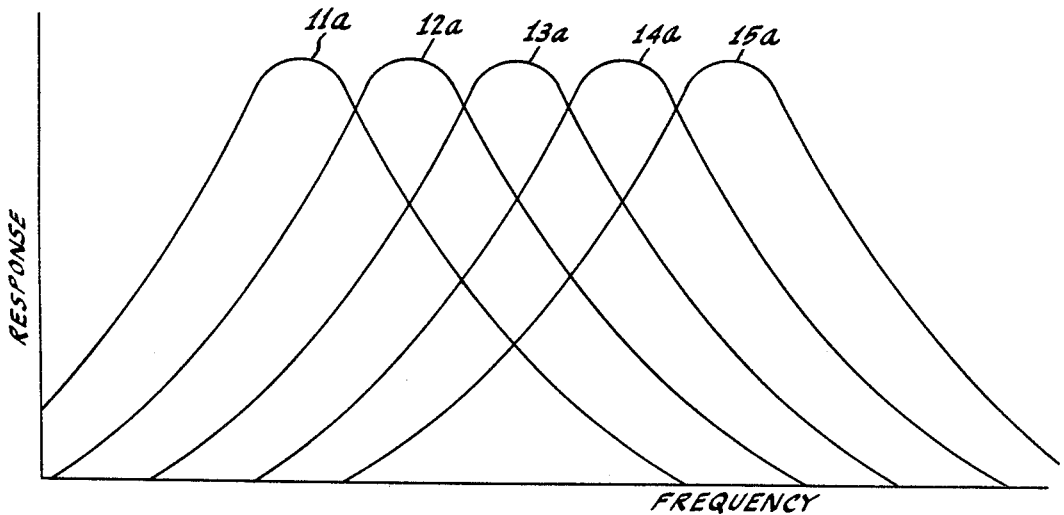

In the drawing:
FIGURE 1 is a schematic block diagram of a signal recognition circuit in accordance with the invention;
FIGURE 2 is a graph illustrating the frequency characteristics of a plurality of filters utilized in the block diagram of FIGURE 1; and,
FIGURE 3 is a schematic circuit diagram of a peak detector circuit in accordance with an aspect of the invention.

Referring to FIGURE 1, a transient signal recognition circuit 10 includes a plurality of bandpass filters 11 through 15 all coupled to an input terminal 16 for the recognition circuit 10. A transient signal 18, which may be of the type illustrated in FIGURE 1, is applied to the input terminal 16. Noise signals may, for example, precede the transient signal 18. The fibers 11 through 15 provide a spectral analysis of the input signals and separate these signals into a plurality of component signals of preselected frequency components. Thus, the transient signal 18 may produce from each of the filters 11 through 15 the component signals 19 through 23, respectively. Each of the component signals 19 through 23 exhibits a different build up or rise time as well as different peak values depending on the frequency content of the input signal 18 and the peaks occur at different times.

The bandpass filters 11 through 15, may, for example, comprise a series of RLC circuits, each of which is designed to exhibit a low Q. Such a low Q bandpass filter does not store much energy and consequently little impulse type ringing occurs when a transient wave such as 18 is applied thereto. Therefore, the shapes of the component signals are determined to a greater degree by the input signals themselves than by the filters. The low Q filters exhibit bandpass characteristics such as those illustrated in FIGURE 2. Each of the curves labeled 11a through 15a corresponds to the frequency response of each of the bandpass filters 11 through 15, respectively. It is to be noted that each of these response curves 11a through 15a overlaps the other response curves.

The output signals 19–23 are applied to a plurality of full wave rectifiers 25 through 29, respectively. The full wave rectifiers 25–29 rectify the output waves 19–23 to provide positive-going pulses for each of these signals. The rectifiers 25 through 29 are coupled, respectively, to a plurality of delay circuits 31 through 35. The delay circuits 31–35 introduce different delays into their corresponding component signals 19–23 to cause the initial or the second peak of these signals to coincide in time. For convenience, it is assumed that the delay circuits 31–35 cause the initial peaks of the component signals to coincide in time. The delay circuit 35 introduces the most delay while the delay circuit 31 introduces the least delay to accomplish this. The rectified and delayed component signals 19–23 are then applied to a plurality of peak detectors 37 through 41. The peak detectors detect the simultaneous occurrence and the values of the peaks of the waveforms 19–23. The outputs of the detectors 37–41 are applied to a recognition decision circuit 44 to determine if the input wave 18 is a desired transient signal. If the peak signals do not occur at the proper times or are not the proper values, the input signal 18 is classified as a "noise" signal.

In operation, an input signal 18 applied to the recognition circuit 10 may be either a desired transient signal or noise. The signal 18 illustrated in FIGURE 1 is a random transient signal. Such random transient signals 18 are substantially identical to each other in frequency content even though their amplitudes may vary. The various frequency components in the asymmetric signal 18 produce a response in each separate one of the bandpass filters 11–15. The filters 11–15 therefore effectively perform a frequency analysis on the input signal 18 to produce a variety of component signals 19–23. The component signals 19–23 are rectified in the full wave rectifiers 25–29, respectively, to produce unipolar signals, the peaks of which are detected in the peak detectors 37–41, respectively. However, the peaks are first aligned in the delay circuits 31–35 to coincide in time with each other. Each of the delay circuits 31–35 introduces a different but predetermined delay to align the peaks of the component signals derived from a desired transient signal 18. Thus, one criterion for separating transient signals 18 from noise is provided by this alignment. The peaks of the component signals of "noise" appearing at the circuit input are not aligned by the predetermintd delays introduced by the delay circuits 31–35.

The simultaneous presence of the peaks of the component signals 19–23 and their values are detected and measured in the detectors 37–41. The output signals from all the detectors 37–41 are applied to a recognition decision circuit 44 wherein a decision is made as to whether the input signal is a desired transient signal. Noise rarely exhibits the same peak buildup or the same peak values as the desired transient signals 18 because of its different temporal spectral content so the different types of input signals are readily separable.

It is to be noted that the frequency characteristics of the transient input signals are analyzed by the filter, rectifier and delay circuits on-the-fly, i.e., without storing these signals, and therefore the decisions are made rapidly. Consequently, the recognition circuit 10 is relatively simple and inexpensive but reliable.

Referring now to FIGURE 3, a detailed schematic circuit diagram of one of the peak detectors 39 is illustrated. The peak detector 39 includes a storage element or delay line 50 having a plurality of taps or terminals $52_1$, $52_2$ . . . $52_{n-1}$, $52_n$ extending throughout the length thereof. First and second electrical "neurons" 54 and 56 are connected, respectively, to the first pair $52_1$ and $52_2$ and last pair $52_{n-1}$ and $52_n$ of the terminals 52 of the delay line 50. An electrical neuron is an electrical circuit that simulates the operation of a biological neuron. An electrical neuron is disclosed in detail in an application entitled "Threshold Circuit" for T. B. Martin and E. P. McGrogan, Jr., Ser. No. 406,681, filed Oct. 27, 1964, and assigned to the same assignee as the present application. The disclosure of that application is herewith incorporated by reference into this application. The electrical neurons 54 and 56 include excitatory input terminals 58 and 60, respectively, and inhibitory input terminals 62 and 64, respectively. The neurons 54 and 56 produce an output when an input signal applied to the excitatory terminal exceeds by a predetermined threshold amount an input signal applied to the inhibitory terminal. Otherwise, the neurons 54 and 56 produce no output.

The inhibitory input terminal 62 of the neuron 54 is coupled to the first tap $52_1$ on the delay line 50 whereas the excitatory input terminal 58 is coupled to the second tap $52_2$ on the delay line 50. Therefore, it is apparent that the neuron 54 produces an output only when a time varying signal in the delay line 50 exhibits a positive slope. Since a signal is applied to the delay line 50 at the left end of the line, such a positive slope indicates that the signal is decreasing. This is shown by the signal 96 in FIGURE 3. The signal 96 is an enlarged version of the trailing edge of the initial peak in the component signal 21. The inhibitory input terminal 64 of the neuron 56 is coupled to the last tap $52_n$ of this delay line 50 whereas the excitatory input terminal 60 is coupled to the penultimate tap $52_{n-1}$. It is apparent therefore that the neuron 56 produces an output only when a time varying signal in the delay line 50 is increasing or exhibiting a negative slope. Such a signal is indicated by the signal 94 which is an enlarged version of the leading edge of the component signal 21. Therefore, the neurons 54 and 56 are effectively slope detectors. A time varying signal that includes both a positive-going and a negative-going slope exhibits a peak therebetween. The signal is bandwidth limited so only a single peak occurs during the delay period of the line 50.

Each of the electrical neurons 54 and 56 includes an output terminal 66 and 68, respectively, both of which are coupled to an AND gate 70. The AND gate 70 produces an output only when both the neurons 54 and 56 produce outputs which is when a time varying wave in the delay line 50 exhibits a peak over the delay period. The length of the delay line 50 is selected to correspond to the component signal 21 and is long enough to store only the peak portion of the component signal 21. The delay line for each of the other detectors exhibits a different length to correspond to these other component signals.

The remaining taps $52_3$ . . . $52_{n-2}$ are each coupled to an anode of a corresponding plurality of diodes 72. The cathode of each of the diodes 72 is coupled to a junction or reference point 74. A resistor 76 couples the reference point 74 to an amplifier 78. The output of the amplifier 78 as well as the output of the AND gate 70 are coupled to two input terminals 80 and 82, respectively, of an analog output gate 84. The gate 84 includes a pair of diodes 86 and 88, the cathodes of which are coupled to the input terminals 80 and 82 whereas the anodes thereof are coupled to an output terminal 90 for the gate 84. The output terminal 90 is also coupled through a resistor 92 to a source of reference potential $+V$.

The output gate 85 produces an output from the terminal 90 that always equals the lesser of the two input signals applied to the input terminals 80 and 82. When the AND gate 70 is inactive, the output thereof is zero and the forward conduction of the diode 88 clamps the output terminal 90 of the gate 84 to zero. When the AND gate 70 is activated, the output thereof is designed to be greater than the peak value of any signal in the delay line 50. Therefore, the diode 88 is reverse biased. The forward conduction of the diode 86 clamps the output terminal to the output value at the amplifier 78 which is a measurement of the peak value of the signal in the delay line 50.

In operation, a component signal such as a rectified version of the signal 21 in FIGURE 1, is applied to the delay line 50. The leading edge portion 94 of the rectified component signal 21 in FIGURE 3 does not produce an output from the neuron 54 at a time such as $t_1$ because the inhibitory input from this increasing signal to the neuron 54 is greater than the excitatory input to the neuron. However, when the peak of input wave 21 passes the tap $52_1$ at a time such as $t_2$, the leading edge portion 94 of the input wave 21 will reach the last two taps $52_{n-1}$ and $52_n$ of the delay line 50. The neuron 56 receives a greater excitatory input from this increasing portion of the signal than an inhibitory input. Therefore, the neuron 56 fires. The neuron 54 also fires because the trailing edge portion 96 of the waveform 21 at the time $t_2$ produces a greater excitatory input to the terminal 58 of the neuron 54 than inhibitory input to the terminal 62. Thus, both the neurons 54 and 56 fire. The neurons 54 and 56 fire simultaneously only if the input wave 21 exhibits a predetermined shape that corresponds to the length of the delay line 50. If the width is too small, then one or the other, but not both, of the neurons fires. If the width is too large, the excitatory inputs will not exceed the inhibitory inputs by the threshold amounts and neither neuron fires. Thus, the neurons 54 and 56 detect the occurrence of a peak only in a desired transient signal.

The firing of the neurons 54 and 56 activates the AND gate 70 to produce a peak detection signal to denote that a peak is detected in the delay line 50. The plurality of diodes 72 search for this peak. A plurality of diodes 72 are utilized to permit the detector 39 to tolerate slight misalignments. If the peak occurs at the tap $52_5$, for example, the diode $72_3$ is forward biased to conduct and the conduction of the diode $72_3$ reverse biases all of the other diodes in this circuit. The reference point 74, therefore, assumes the potential of the peak of the wave 21. This peak value is amplified a predetermined amount in the amplifier 78 and is applied to the gate 84 along with the output of the AND gate 70. The lower of these two signals, i.e., the one from the amplifier 78, causes the diode 86 to conduct. The conduction of the diode 86 clamps the output terminal 90 to the peak value of the wave 21. The output terminal 90 provides an amplitude measurement of the wave 21. Thus, the detector 39 not only detects a peak but also provides a measurement of the amplitude of this peak by providing an indication of the value of the peak.

Thus, a peak value detector is provided to detect a peak that occurs in a transient signal and to provide a measurement of the value of this peak. Such a peak value detector is utilized in performing a frequency analysis on an input transient signal to separate such a signal from noise signals.

What is claimed is:
1. A detector,
comprising in combination,
a delay line having sending and receiving ends for storing an input signal,
first and second slope detectors coupled to the sending and receiving ends of said delay line, respectively, to be actuated by a positive slope and a negative slope, respectively, in said input signal to detect the presence of a peak therein,
a plurality of sensing devices coupled to said delay line to sense the magnitude of said peak, and
means coupled to said sensing devices for providing an output signal corresponding to said magnitude of said peak.

2. The combination in accordance with claim 1 wherein
said first and second slope detectors comprise first and second electrical neuron circuits, respectively.

3. A detector,
comprising in combination,
a delay line for temporarily storing an input signal and having a plurality of taps,
a first electrical neuron circuit coupled to a pair of taps at the input of said delay line to detect an input signal having a positive-going slope,
a second electrical neuron circuit coupled to a pair of taps at the output of said delay line to detect a negative-going slope,
a coincidence gate coupled to each of said neurons to denote the detection of a peak in said input signal when both neurons are simultaneously activated,
a junction point,
a plurality of diodes coupled from said taps to said junction point and poled to conduct in a forward direction to said junction point to sense the location of said peak in said delay line, and
an output gate having one input coupled to said junction point and another input coupled to said coincidence gate,
said output gate providing an output that equals the lesser of the two inputs.

References Cited

UNITED STATES PATENTS

| | | | |
|---|---|---|---|
| 2,897,442 | 7/1959 | Wright et al. | 324—77 |
| 3,042,800 | 7/1962 | Gluth | 324—77 |
| 3,147,443 | 9/1964 | Mason et al. | 324—77 X |
| 3,178,582 | 4/1965 | Crane | 324—77 X |
| 3,213,197 | 10/1965 | Hawkins | 324—77 X |
| 3,247,457 | 4/1966 | Kaenel | 324—77 X |
| 3,270,188 | 8/1966 | Ares. | |
| 3,293,609 | 12/1966 | Martin. | |
| 3,310,784 | 3/1967 | Hilinski | 179—1 X |
| 3,334,298 | 8/1967 | Monrad-Krohn | 324—77 |

RUDOLPH V. ROLINEC, *Primary Examiner.*

P. F. WILLE, *Assistant Examiner.*